United States Patent
Broom et al.

(10) Patent No.: US 6,324,033 B1
(45) Date of Patent: *Nov. 27, 2001

(54) HEAD RETRACT ASSEMBLY FOR DISK DRIVE

(75) Inventors: Walter E. Broom, Longmont; Mark A. Swenson, Lafayette; Lee Schultz, Arvada, all of CO (US)

(73) Assignee: Iomega Corporation, Roy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/418,231

(22) Filed: Oct. 14, 1999

(51) Int. Cl.[7] ............................... G11B 5/54; G11B 17/02
(52) U.S. Cl. ..................... 360/255.5; 360/99.06
(58) Field of Search ............................... 360/254.1, 255.1, 360/99.02, 99.03, 99.06, 99.07, 254.2, 255.5, 254.6; 369/75.1, 77.2

(56) References Cited

U.S. PATENT DOCUMENTS

| | | | |
|---|---|---|---|
| 5,237,473 | * | 8/1993 | Yoshida ............................... 360/99.06 |
| 5,278,819 | * | 1/1994 | Shimegi et al. ................... 360/99.06 |
| 5,438,465 | * | 8/1995 | Noda ....................................... 360/75 |
| 5,650,891 | * | 7/1997 | Thayne et al. ..................... 360/99.06 |
| 5,898,539 | * | 4/1999 | Yokota et al. ..................... 360/99.06 |

* cited by examiner

Primary Examiner—Robert S. Tupper
(74) Attorney, Agent, or Firm—Woodcock Washburn LLP

(57) ABSTRACT

A disk drive has a frame for receiving and retaining a disk cartridge which includes a disk therein, such disk being rotatable about a first axis perpendicular to the frame and cartridge. An actuator is mounted to the frame and is movable a first lesser amount from a first position to a second position and a second greater amount from the first position to a third position. A retract/eject lever is also mounted to the frame, is rotatable on an axis parallel to the first axis by the actuator, and is biased to a resting position. The actuator upon being moved to the second position rotates the retract/eject lever into a head-retracting position. The actuator upon being moved to the third position rotates the retract/eject lever to the head-retracting position and then to a cartridge-ejecting position. A head assembly is mounted to the frame and is movable toward and away from the retained disk cartridge and the disk therein for reading data from/writing data to such disk. A head retracting assembly is mounted to the frame for retracting the head assembly away from the retained disk cartridge when the retract/eject lever is rotated to the second position. A cartridge transport assembly is mounted to the frame for ejecting the retained cartridge when the retract/eject lever is rotated to the third position.

14 Claims, 9 Drawing Sheets

HEAD RETRACT ASSEMBLY FOR DISK DRIVE

CROSS REFERENCE TO RELATED APPLICATIONS

The present application is related to and filed concurrently with U.S. patent application Ser. No. 09/417,646, entitled "CARTRIDGE RETENTION AND EJECTION ASSEMBLY FOR DISK DRIVE"; U.S. patent application Ser. No. 09/417,734, entitled "DISK MOTOR ACTUATION ASSEMBLY FOR DISK DRIVE"; and U.S. patent application Ser. No. 09/418,401, entitled "COMMONLY ACTUATED HEAD RETRACT ASSEMBLY AND CARTRIDGE TRANSPORT ASSEMBLY FOR DISK DRIVE", each of which is hereby incorporated by reference.

FIELD OF THE INVENTION

The present invention relates to a cartridge transport assembly in a disk drive for receiving a cartridge thereinto, retaining the received cartridge, and ejecting the retained cartridge therefrom, and also to a head retracting assembly for ensuring that a disk drive read/write head is retracted prior to such cartridge ejection. More particularly, the present invention relates to such assemblies that operate under the direction of a single actuator, where the assemblies and the actuator are relatively inexpensive.

BACKGROUND OF THE INVENTION

A disk drive for receiving a removable disk cartridge is known. Examples of such a disk drive include a conventional 3.5 inch 'floppy' disk drive, a "ZIP" disk drive as developed and marketed by IOMEGA Corporation of Roy, Utah, and the like. Such a disk drive is typically coupled to a processor or the like, and facilitates an exchange of information between the processor and a disk contained within the disk cartridge. The disk and the disk drive may be magnetically or optically based, for example.

The disk cartridge typically includes an outer casing or shell that houses the aforementioned disk therein. The disk is mounted on a hub and can rotate freely within the cartridge. Typically, the disk drive includes a motor which engages the hub of the disk and applies a rotating force to such hub. The outer shell has an aperture at an edge thereof (at least in the case of a "ZIP" disk as developed and marketed by IOMEGA Corporation of Roy, Utah for use in connection with the aforementioned "ZIP" disk drive), and the disk drive includes at least one read/write head that is brought into close proximity to the disk in the disk cartridge by way of the aperture for purposes of reading data from the disk and/or writing data to the disk. A shutter may be provided to cover the aperture when the disk cartridge is removed from the disk drive. Such disk drive may include a shutter opening feature for automatically opening the shutter upon inserting the disk cartridge into the disk drive.

In a relatively sophisticated drive such as the aforementioned "ZIP" disk drive, it is desirable to include an electronically actuatable disk cartridge ejection feature. Accordingly, ejection of the disk cartridge merely requires an appropriate electronic command, originating either from the processor coupled to the disk drive or from the disk drive itself. Of course, prior to disk cartridge ejection, the read/write head(s) of the disk drive are retracted from the disk inside the disk cartridge to a retracted position where ejection of the disk cartridge will not harm or destroy the sensitive head(s).

In the case of the aforementioned "ZIP" disk drive, one assembly is provided for receiving the disk cartridge, retaining the received cartridge, and ejecting the retained disk cartridge, and another assembly is provided for retracting the read/write head(s) prior to disk cartridge ejection, where both assemblies are actuated by a single actuation unit. However, a current version of such actuation unit is a rather complicated affair having multiple cogs, gears, worms, levers, and the like, and consequently is relatively expensive to manufacture.

A need exists, then, for an actuation unit that is simpler and that is therefore relatively inexpensive to manufacture. Moreover, a need exists for corresponding assemblies that are compatible with such a simpler actuation unit, where such assemblies are also simple and therefore relatively inexpensive to manufacture.

SUMMARY OF THE INVENTION

In the present invention, the aforementioned need is satisfied by a disk drive that has a frame for receiving and retaining a generally planar disk cartridge therein. The cartridge moves along a first line within the frame and includes a disk therein. The disk within the retained cartridge is rotatable about a first axis generally perpendicular to the frame and cartridge.

A selectively actuatable actuator is mounted to the frame, and is movable a first amount from a first position to a second position and also is movable a second amount greater than the first amount from the first position to a third position. A retract/eject lever is also mounted to the frame, is rotatable on an axis generally parallel to the first axis between a cartridge-receiving/-retaining and guide pin retaining position, a head-retracting position, and a cartridge-ejecting position, and is biased to the cartridge-receiving/-retaining and guide pin retaining position.

The actuator upon being moved the first amount from the first position to the second position contacts the retract/eject lever and thereby rotates the retract/eject lever into the head-retracting position. The actuator upon being moved the second amount from the first position to the third position contacts the retract/eject lever and thereby rotates the retract/eject lever to the head-retracting position, and further rotates the retract eject lever to the cartridge-ejecting position.

A read/write head assembly is mounted to the frame and is generally movable toward and away from the retained disk cartridge and the disk therein for reading data from/writing data to such disk. A head retracting assembly is mounted to the frame for retracting the head assembly away from the retained disk cartridge. The head retracting assembly is coupled to the retract/eject lever and retracts the head assembly when the retract/eject lever is rotated to the second position.

A cartridge transport assembly is mounted to the frame for receiving the cartridge into the frame, retaining the received cartridge, and ejecting the retained cartridge. The cartridge transport assembly is coupled to the retract/eject lever and ejects the retained cartridge when the retract/eject lever is rotated to the third position.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENT

Figure 1:
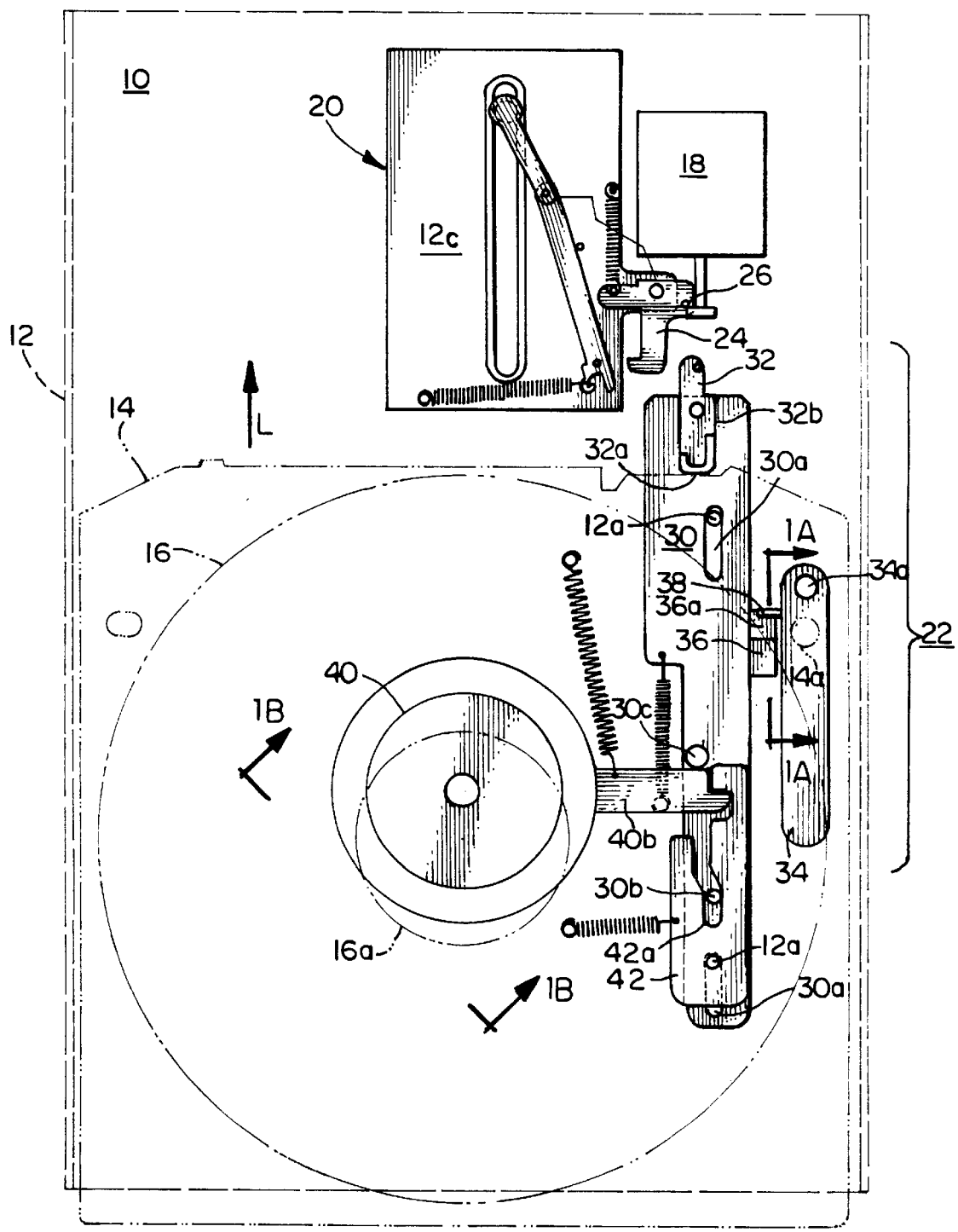
FIG. 1 is a diagrammatic view of a disk drive in accordance with one embodiment of the present invention, and shows the disk drive receiving a disk cartridge therein.

Certain terminology may be used in the following description for convenience only and is not considered to be limiting. The words "left", "right", "upper", and "lower" designate directions in the drawings to which reference is made. The words "inwardly" and "outwardly" are further directions toward and away from, respectively, the geometric center of the referenced object. The terminology includes the words above specifically mentioned, derivatives thereof, and words of similar import.

Referring now to FIGS. 1–7, wherein like numerals are used to indicate like elements throughout, a disk drive 10 is shown in accordance with one embodiment of the present invention. As seen in FIG. 1, the disk drive 10 has a frame 12 for receiving and retaining a generally planar disk cartridge 14 therein. The frame 12 and the cartridge 14 may be of any particular complementary design without departing from the spirit and scope of the present invention. For example, the frame may be designed to receive and retain a conventional 3.5 inch 'floppy' disk, a "ZIP" disk as developed and marketed by IOMEGA Corporation of Roy, Utah, or the like. In any event, the cartridge 14 when received into the frame 12 moves along a first line L within the frame 12.

As was discussed above, the cartridge 14 includes a disk 16 therein, where the disk 16 is employed to store information thereon in a digital form or otherwise. As, should be understood, the disk 16 within the retained cartridge 14 is to be rotated about a first axis generally perpendicular to the frame 12 and cartridge 14. The disk 16 and the disk drive 10 may be magnetically based, optically based, or otherwise based without departing from the spirit and scope of the present invention. In the case of the aforementioned "ZIP" disk and drive, information is stored by the disk drive 10 onto the disk 16 in a magnetic form.

Figure 5:
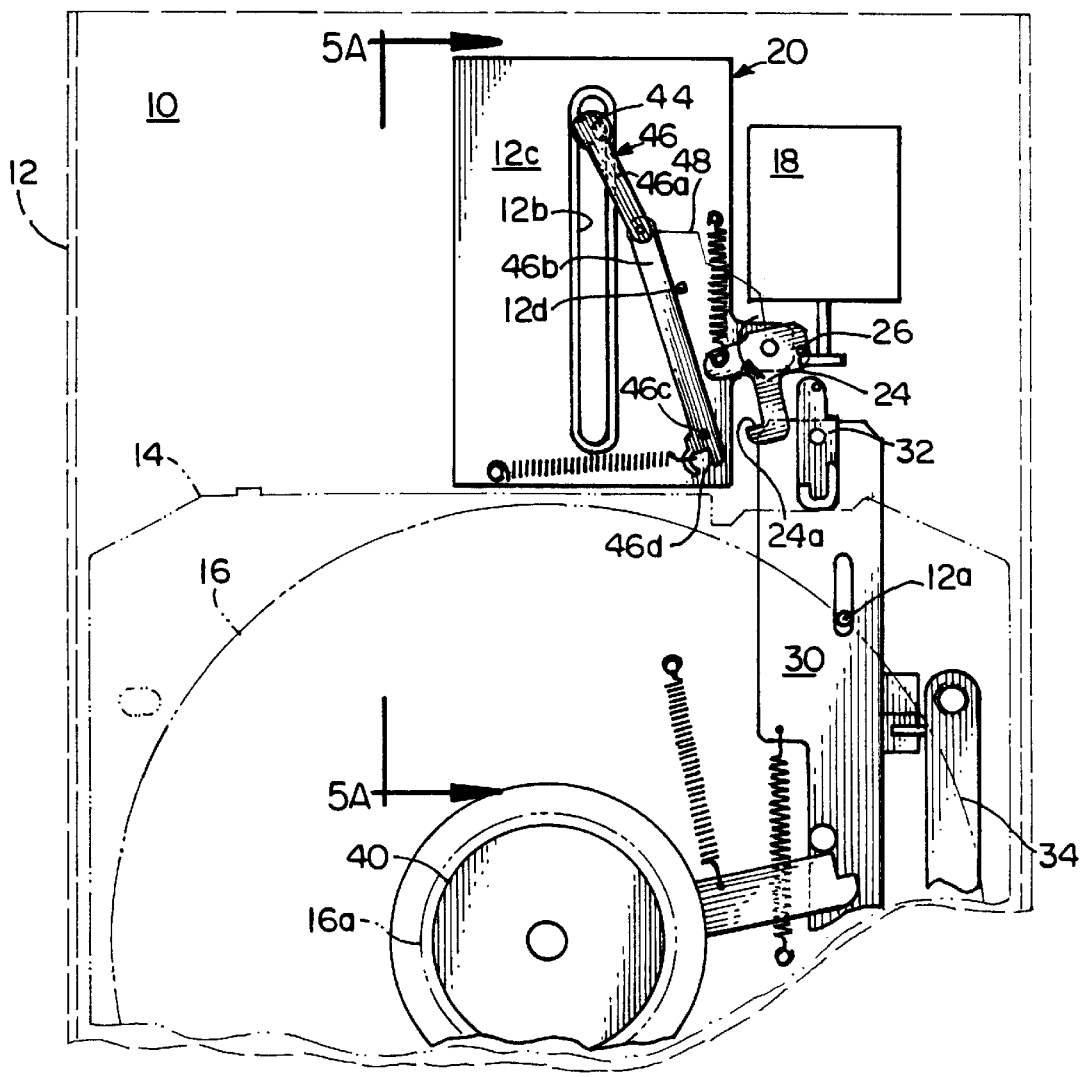
FIG. 5 is a partial diagrammatic view of the disk drive of FIG. 1, and shows the disk drive after the retract/eject lever releases the retained linkage and the linkage returns to the first position.
Figure 6:
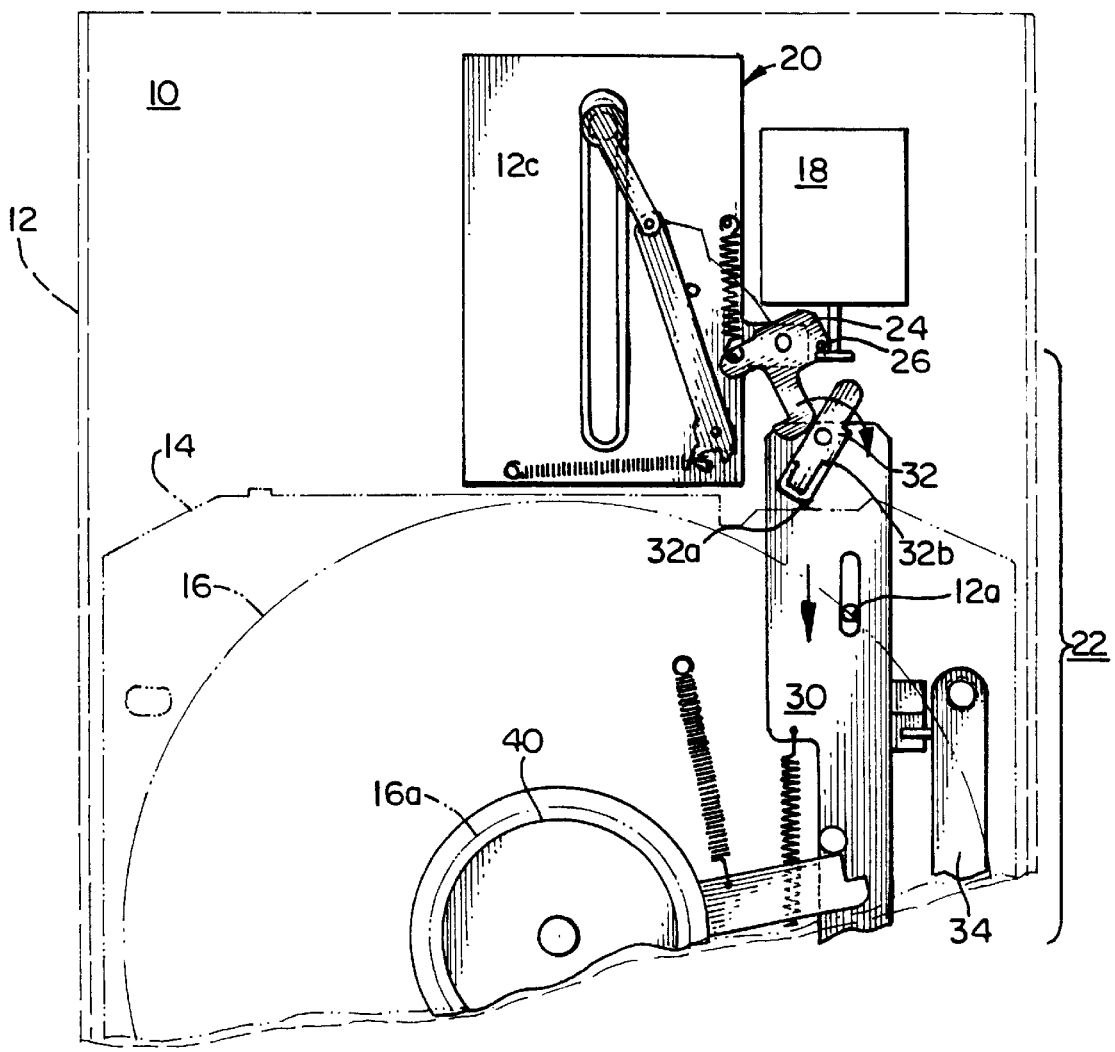
FIG. 6 is a diagrammatic view of the disk drive of FIG. 1, and shows the disk drive as the retract/eject lever rotates the cam and the rotated cam begins to allow the drag link to move and release the cartridge retention pin from the disk cartridge.

Importantly, in the present invention, a selectively actuatable actuator 18 is mounted to the frame 12, and is movable a first amount from a first position to a second position (FIGS. 3, 5), and also is movable a second amount greater than the first amount from the first position to a third position (FIG. 6). As will be better understood from the discussion below, the movement of the first amount the first position to the second position may be referred to as a 'soft pick' and is employed in connection with a head-retract assembly 20 (FIGS. 3–5), and the movement of the second amount from the first position to the third position may be referred to as a 'hard pick' and is employed in connection with a cartridge-transport assembly 22 (FIGS. 1, 2, 6, 7). As should now be appreciated, performance of a hard pick by the actuator 18 by its nature also includes performance of a soft pick.

In one embodiment of the present invention, the actuator 18 is a solenoid having a plunger, where the plunger is generally linearly movable between a range of positions between a fully plunged position and a fully extended position. As shown in the drawings, the first position corresponds to the fully extended position, the third position corresponds to the fully plunged position, and the second position is midway therebetween.

Preferably, the plunger of the solenoid 18 is biased to the fully extended position, and plunges an increasing depth corresponding to an increasing voltage and/or current input to the solenoid. Since solenoids and the operation thereof is generally known, further discussion in this regard is deemed unnecessary. Of course, the solenoid 18 may be configured alternately, and actuators 18 other than a solenoid maybe employed, all without departing from the spirit and scope of the present invention. For example, the solenoid 18 may be biased to the fully plunged position, or a rotary motor may be employed if appropriately configured.

Still referring to FIG. 1, the disk drive 10 of the present invention has a retract/eject lever 24 mounted to the frame 12, where the retract/eject lever 24 may have a contacting pin 26 or the like mounted thereto. The retract/eject lever 24 is rotatable on an axis generally parallel to the first axis between:

a cartridge-receiving/-retaining and guide pin retaining position (FIG. 1) corresponding to the first position of the actuator 18, a head retracting position (FIG. 5) corresponding to the second position of the actuator 18, and a cartridge-ejecting position (FIG. 6) corresponding to the third position of the actuator 18, where it should be appreciated that the actuator 18 upon being moved through the first, second, and third positions may contact the contacting pin 26 on the retract/eject lever 24 and thereby rotates the retract/eject lever 24 into the corresponding positions. Alternatively, such actuator 18 may contact the lever 24 directly (not shown). As seen, the retract/eject lever 24 is biased to the cartridge-receiving/-retaining and guide pin retaining position of FIG. 1 by a biasing device such as a spring, although other biasing devices may be employed without departing from the spirit and scope of the present invention.

As should be understood, although the retract/eject lever 24 is in fact shown as a lever, other mechanical devices may be substituted without departing from the spirit and scope of the present invention if appropriately configured. Moreover, the combination of the actuator 18 and the lever 24 may be substituted by another actuating-and-applying structure without departing from the spirit and scope of the present invention, again if appropriately configured.

Figure 3:
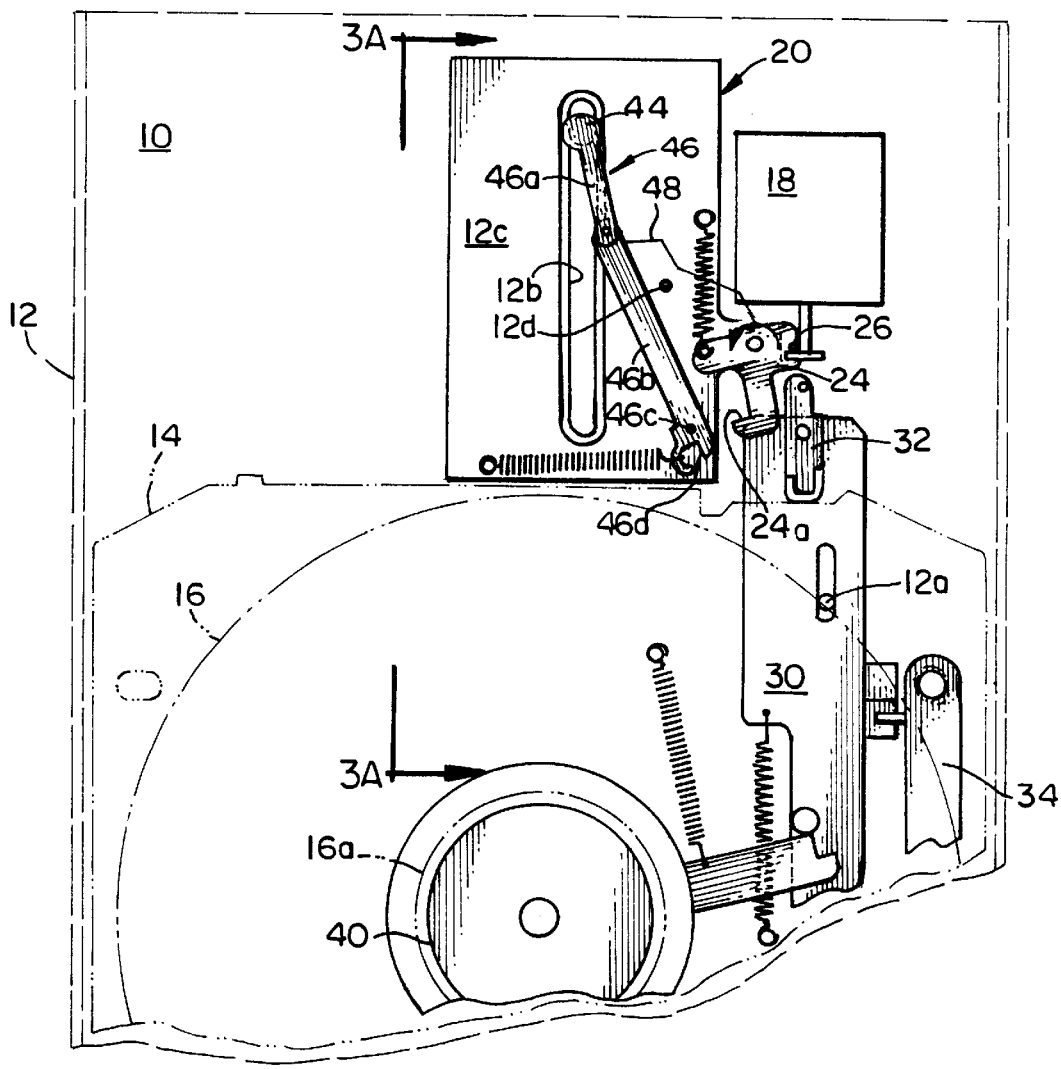
FIG. 3 is a partial diagrammatic view of the disk drive of FIG. 1, and shows the disk drive after the kicker kicks the linkage from the first position to the second position.
Figure 3A:
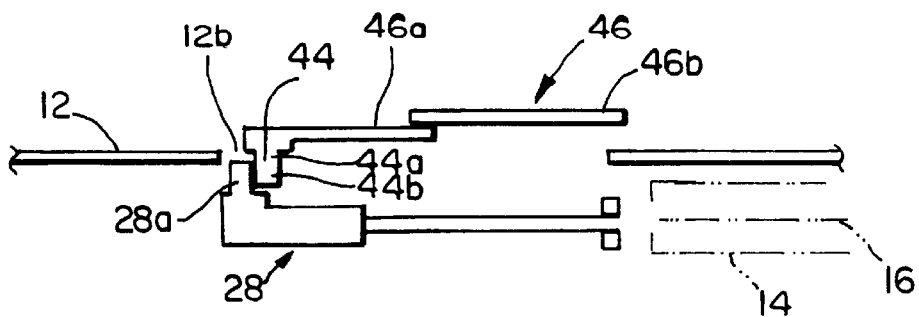
Figure 4A:
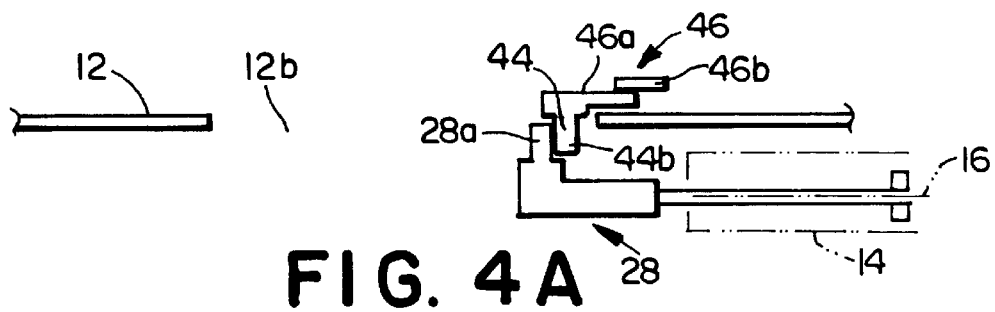
Figure 5A:
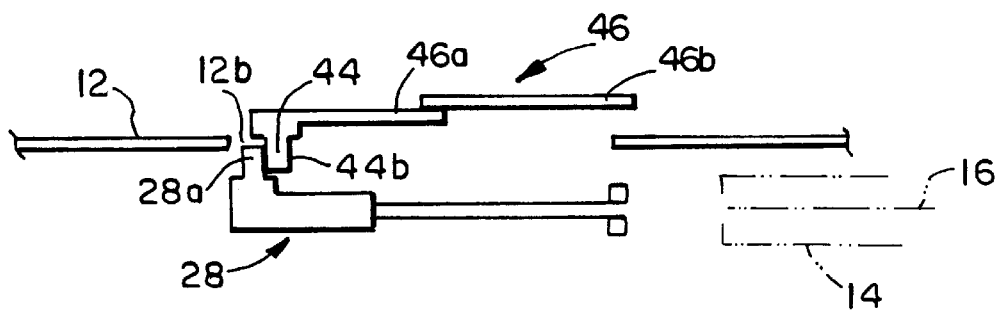

Referring to FIGS. 3A, 4A, and 5A, a read/write head assembly 28 is mounted to the frame 12 and is generally movable toward and away from the retained disk cartridge 14 (FIG. 4) and the disk 16 therein by way of appropriate means (not shown) for reading data from/writing data to such disk 16. The structure and operation of such head assembly 28 are generally known and therefore need not be discussed herein in any detail. As shown, the head assembly 28 moves generally linearly in a generally radial manner with respect to the disk 16, although the head assembly may instead move non-linearly and/or non-radially without departing from the spirit and scope of the present invention.

The cartridge transport assembly 22 is mounted to the frame 12 of the disk drive 10 to receive the cartridge 14 into the frame 12 (FIG. 1), retain the received cartridge 14 (FIG. 2), and eject the retained cartridge 14 (FIGS. 6, 6A, 7) at an appropriate time. As was discussed above, the cartridge transport assembly 22 is coupled to the retract/eject lever 24, and ejects the retained cartridge 14 when the actuator 18 performs a hard pick (i.e., is moved to the third position), thereby rotating the retract/eject lever 24 to the cartridge-ejecting position.

In particular, the cartridge transport assembly 22 includes a drag link 30 which is mounted to the frame 12, and which is generally linearly movable along the first line L generally parallel to movement of the cartridge 14 during reception and ejection thereof (FIGS. 1, 6, 6A, and 7). As shown, the drag link 30 moves between a cartridge-receiving/-ejecting position (FIGS. 1, 7) and a cartridge-retaining position (FIGS. 2–5). The drag link 30 is biased to the cartridge-receiving/-ejecting position by a biasing device such as a spring, although other biasing devices may be employed without departing from the spirit and scope of the present invention.

Figure 2A:
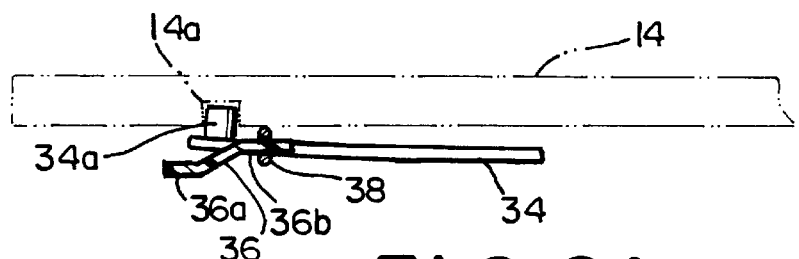
Figure 2B:
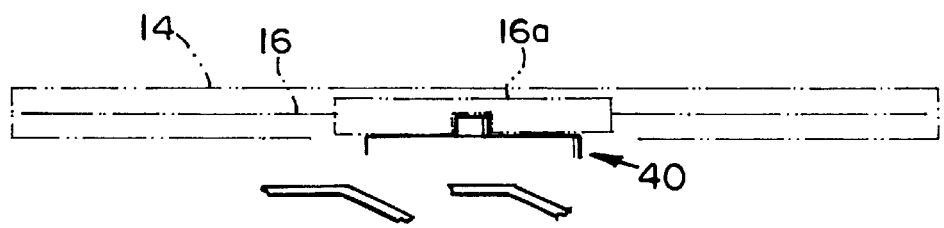
Figure 2:
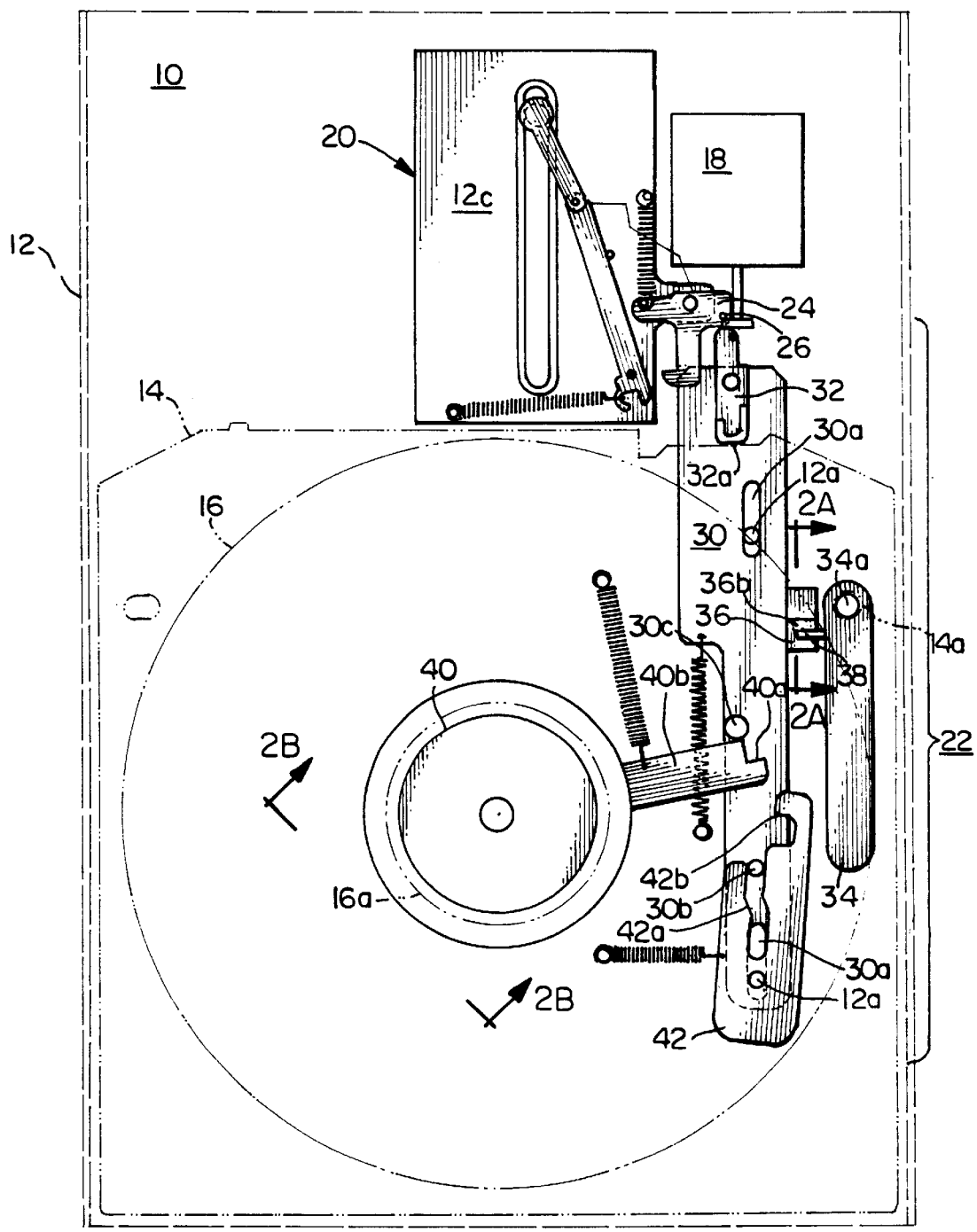
FIG. 2 is a diagrammatic view of the disk drive of FIG. 1, and shows the disk drive retaining the received disk cartridge.

In one embodiment of the present invention, and as particularly seen in FIGS. 1 and 2, one of the drag link 30 and the frame 12 includes a pair of guide slots 30a each extending generally along the first line L. As seen, each guide slot 30a receives a guide pin 12a fixedly mounted to the other of the drag link 30 and the frame 12. Accordingly, the guide slots 30a and guide pins 12a restrict linear movement of the drag link 30 within a pre-defined range. As shown, the drag link 30 includes the pair of guide slots 30a, and the guide pins 12a are fixedly mounted to the frame 12.

Figure 6A:
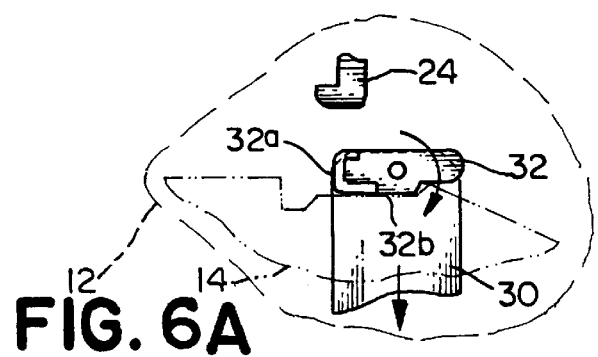
FIG. 6A is a diagrammatic view of a portion of the disk drive of FIG. 1, and shows the fully rotated cam allowing the drag link to move and release the cartridge retention pin from the disk cartridge.

A cam 32 is mounted to the distal end of the drag link 30 and thus moves with the drag link 30. As shown, the cam 32 is rotatable on an axis generally parallel to the first axis between a cartridge-receiving/-retaining position (FIGS. 1–5) and a cartridge-ejecting position (FIG. 6A). The cam 32 is biased to the cartridge-receiving/-retaining position by a biasing device such as a spring, although other biasing devices may be employed without departing from the spirit and scope of the present invention.

The cam 32 has a reception contact surface 32a at an edge thereof relatively farther from the axis thereof and an ejection contact surface 32b at an edge thereof relatively closer to the axis thereof. As seen, the cartridge initially contacts the reception contact surface 32a during reception thereof (FIG. 1), and remains in contact with such reception contact surface 32a during retention thereof (FIGS. 2–5). During ejection of the cartridge 14, the cam 32 is rotated such that the ejection contact surface 32b moves (FIG. 6) into contact with such cartridge 14 (FIG. 6A).

Figure 1A:
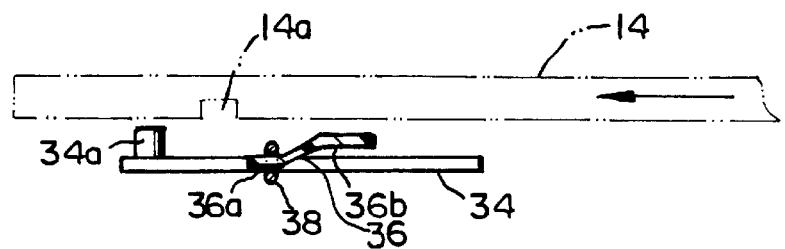
FIGS. 1A, 1B, 2A, 2B, 3A, 4A, and 5A are respectively cross-sectional views taken along the line 1A—1A of FIG. 1, 1B—1B of FIG. 1, 2A—2A of FIG. 2, 2B—2B of FIG. 2, 3A—3A of FIG. 3, 4A—4A of FIG. 4, and 5A—5A of FIG. 5.

A cartridge retention assembly 34 is mounted to the frame 12, and includes a cartridge retention pin 34a mounted thereto for cooperating with a retention aperture 14a in the cartridge 14 to retain the received cartridge 14. The cartridge retention pin 34a is movable in a line generally parallel to the first axis between a cartridge-receiving/-ejecting position (FIG. 1A) and a cartridge-retaining position (FIG. 2A). Although the cartridge retention pin 34a as shown cooperates with the retention aperture 14a in the cartridge 14, alternate devices may be employed in the cartridge retention assembly 34 without departing from the spirit and scope of the present invention. For example, the assembly 34 may include a blocking device moved in front of the proximal edge of the cartridge 14 to prevent the cartridge 14 from ejecting from the disk drive 10.

As shown, a ramp 36 is mounted to one of the drag link 30 and the cartridge retention assembly 34, and has a cartridge-receiving/-ejecting level 36a (FIGS. 1, 1A) and a cartridge-retaining level 36b (FIGS. 2, 2A) with respect to a line generally parallel to the first axis. Correspondingly, a ramp-engaging device 38 is mounted to the other of the drag link 30 and the cartridge retention assembly 34, and is in cooperative contact with the ramp 36 such that the ramp-engaging device 38 contacts the cartridge-receiving/-ejecting level 36a when the drag link 30 is in the cartridge-receiving/-ejecting position (FIGS. 1, 1A), and contacts the cartridge-retaining level 36b when the drag link 30 is in the cartridge-retaining position (FIGS. 2, 2A). As seen in the drawings, the ramp 36 is mounted to the drag link 30 and the ramp-engaging device 38 is mounted to the cartridge retention assembly 34.

In one embodiment of the present invention, the ramp-engaging device 38 is a pin that follows along one side of the ramp 36. In such situation, the cartridge retention assembly and pin 34, 34a should be biased to either the cartridge-retaining position or the cartridge-receiving/-ejecting position, as appropriate. In another embodiment, the ramp-engaging device 38 includes a first pin engaging a top side of the ramp and a second, generally opposing pin engaging a bottom, opposing side of the ramp, as shown in FIGS. 1A and 2A. In such situation, biasing is likely not necessary for the cartridge retention assembly and pin 34, 34a.

Referring specifically to FIGS. 1 and 1A, now, it is seen that during reception of the cartridge 14, the drag link 30 is at the cartridge-receiving/-ejecting position, the cam 32 is at the cartridge-receiving/-retaining position such that the cartridge initially contacts the reception contact surface 32a, and the ramp-engaging device 38 contacts the ramp 36 at the cartridge-receiving/-ejecting level 36a thereof such that the cartridge retention pin 34a is in the cartridge-receiving/-ejecting position.

Referring now to FIGS. 2 and 2A, it is seen that during retention of the cartridge 14, the cartridge 14 contacts the reception contact surface 32a of the cam 32 and moves, by way of the contact with the cam 32, the drag link 30 to the cartridge retaining position, thereby moving the ramp 36 with respect to the ramp-engaging device 38 such that the ramp-engaging device 38 contacts the ramp 36 at the cartridge-retaining level 36b, thereby moving the cartridge retention pin 34a into the cartridge-retaining position within the cartridge aperture 14a, thereby retaining the cartridge 14 within the disk drive 10. In addition, moving the cartridge retention pin 34a into the cartridge-retaining position within the cartridge aperture 14a, holds the drag link 30 in the cartridge-retaining position and prevents the drag link 30 from ejecting the cartridge 14 under the biasing force of such drag link 30 (FIG. 7).

Figure 7:
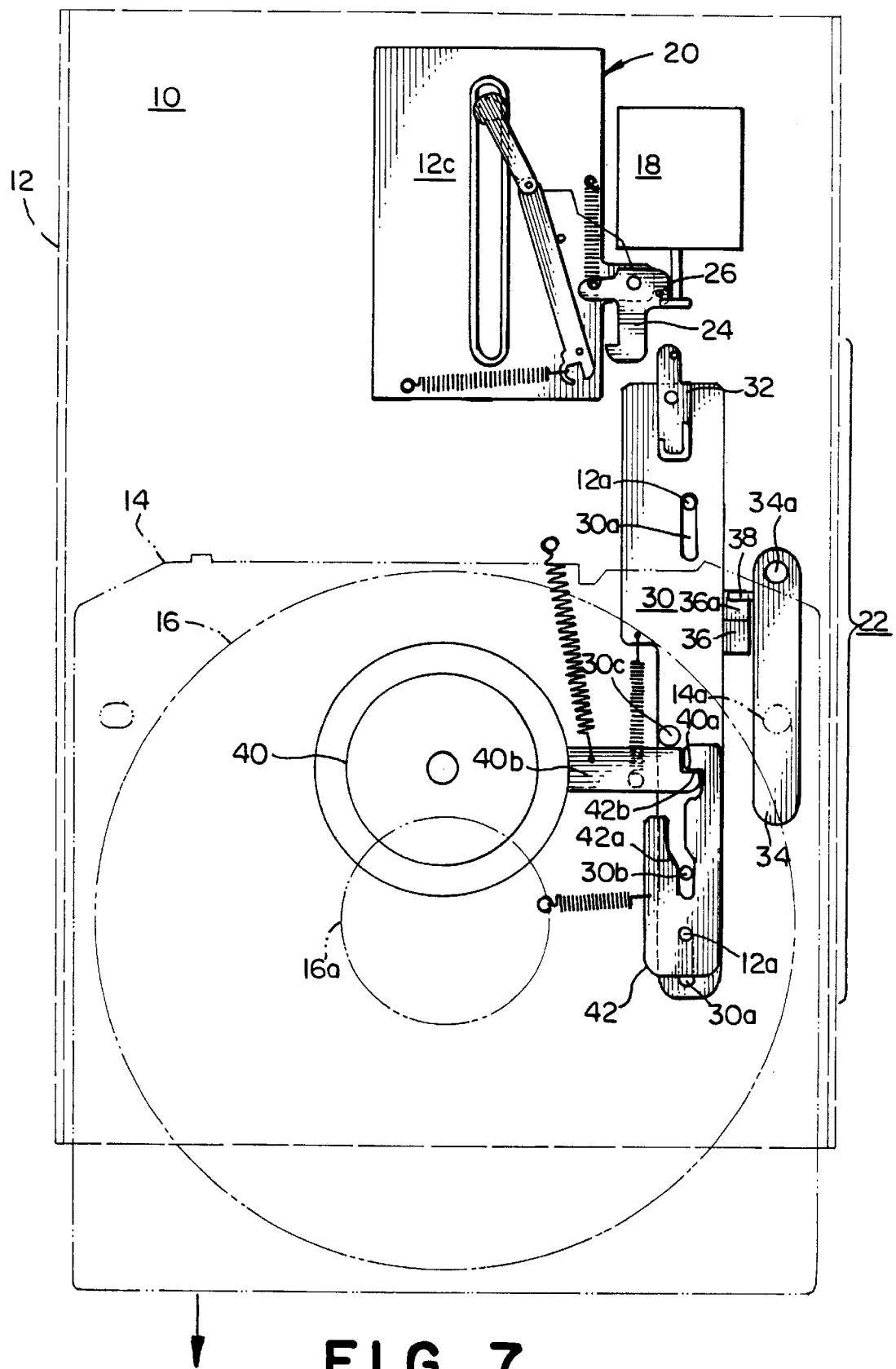
FIG. 7 is a diagrammatic view of the disk drive of FIG. 1, and shows the disk drive after the drag link further moves and ejects the retained disk cartridge.

Referring now to FIGS. 6, 6A, and 7, it is seen that during ejection of the cartridge 14, the cam 32 is rotated (FIG. 6) to the cartridge-ejecting position (FIG. 6A) wherein the cartridge 14 is moved into contact with the ejection contact surface 32b. In particular, and as was discussed above, the actuator 18 performs a hard pick, thereby rotating the retract/eject lever 24 to the cartridge-ejecting position. The retract/eject lever 24 upon rotation into the cartridge-ejecting position may contact the cam 32 directly, as is shown, thereby rotating the cam 32 into the cartridge-ejecting position. Alternatively, the cam 32 may have a pin or the like mounted thereto (not shown) such that the retract/eject lever 24 upon rotation into the cartridge-ejecting position contacts the pin on the cam 32 and thereafter rotates the cam 32 into the cartridge-ejecting position.

As may be appreciated, and as seen in FIGS. 6A and 7, in the cartridge-ejecting position of the cam 32, such cam 32 allows the drag link 30 to move toward the cartridge-receiving/-ejecting position, where such movement occurs because the ejection contact surface 32b is closer to the axis of the cam 32 than the reception contact surface 32a. In particular, such drag link 30 moves a distance equal to the difference between the radius of the reception contact surface 32a and the radius of the ejection contact surface 32b.

As should be understood, such distance is relatively short but is enough to allow the ramp 36 to move with respect to the ramp-engaging device 38 such that the ramp-engaging device 38 contacts the ramp 36 at the cartridge-receiving/-ejecting level 36a. Accordingly, the cartridge retention pin 34a is moved into the cartridge-receiving/-ejecting position (see FIG. 1A). As a result, the cartridge retention pin 34a no longer retains the cartridge 14, thus allowing the drag link 30 to continue ejecting the cartridge 14 under the biasing force of such drag link 30 (FIG. 7).

Referring again to FIGS. 1 and 2, among others, the disk drive 10 also includes a disk motor 40 mounted to the frame 12 for rotating the disk 16 within the disk cartridge 14. Typically, the disk 16 includes a hub 16a, and the motor 40 and hub 16a are brought into contact to allow the motor 16a to impart rotational force to such hub 16a and the disk 16. Operation of the motor 40, the design of the motor 40 and the hub 16a, and the interaction therebetween are generally known and therefore need not be described herein in any further detail.

In one embodiment of the present invention, the motor 40 is moved into contact with the disk 16 (rather than the disk 16 being moved into contact with motor 40) in a direction generally perpendicular to the plane of such disk 16. Moreover, such movement of such motor 40 is actuated as part of retaining the disk cartridge 14 in the frame 12 (FIG. 2). Accordingly, the motor 40 is movable between a disk-engagement position (FIG. 1B) and a disk-separation position (FIG. 2B). Such motor 40 is biased to the disk-engagement position by a biasing device such as a spring, although other biasing devices may be employed without departing from the spirit and scope of the present invention.

As shown, the disk motor 40 is helically mounted to the frame, and thus moves in a helical manner about the first axis between the disk-engagement position and the disk-separation position and into contact with the disk 16 to rotate such disk 16. That is to say, rotation of the body of the motor 40 about the first axis achieves displacement of such motor 40 along such first axis. The motor 40 may be any appropriate motor and the helical mount may be any appropriate helical mount without departing from the spirit and scope of the present invention as long as such motor 40 is suitable for the purpose of rotating the disk 16 at a suitable speed and such helical mount is suitable for the purpose of achieving contact between the motor 40 and the disk 16 in a given amount of rotation. Disk motors and helical mounts are generally known and therefore need not be further described herein in detail.

In one embodiment of the present invention, and as shown, a motor release lever pin 30b is mounted to the drag link 30, and a motor release lever 42 is mounted to the frame 12. The motor release lever 42 is rotatable on an axis generally parallel to the first axis between a cartridge-receiving/-ejecting position (FIGS. 1, 7) and a cartridge-retaining position (FIGS. 2–5). Such motor release lever 42 may be biased to the cartridge-receiving/-ejecting position by a biasing device such as a spring, although other biasing devices (if used) may be employed without departing from the spirit and scope of the present invention.

As seen, the motor release lever 42 has a shaped slot 42a that receives the motor release lever pin 30b, whereby the shaped slot 42a and the motor release lever pin 30b co-act to rotate the motor release lever 42 according to the liner movement of the drag link 30. At the same time, such shaped slot 42a and such motor release lever pin 30b co-act to restrict rotational movement of the motor release lever 42 within a pre-defined range. Importantly, the motor release lever 42 has a catching surface 42b and the motor 40 has a latching surface 40a (best seen in FIG. 2), and the catching surface 42b of the motor release lever 42 catches the latching surface 40a of the motor 40 when the motor 40a is in the disk-separation position (FIGS. 1, 7).

In one embodiment of the present invention, the motor 40 has a motor release arm 40b mounted thereto, where such motor release arm 40b extends generally radially from the motor 40 and has the latching surface 42a (FIG. 2) of the motor thereon. In addition, a motor release arm pin 30c is mounted to the drag link 30, and is in communication with the motor release arm 40b during movement of the drag link 30 from the cartridge-retaining position to the cartridge-receiving/-ejecting position to move the motor release arm 40b and motor 40 into the disk-separation position.

Figure 1B:
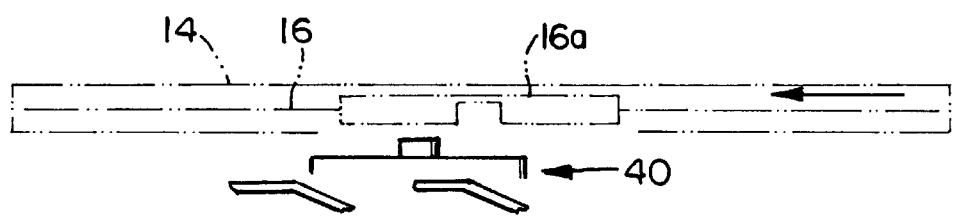

In operation, and referring to FIGS. 1 and 1B, now, when the drag link 30 is at the cartridge-receiving/-ejecting position, the motor release lever pin 30b is positioned within the shaped slot 42a of the motor release lever 42 such that the motor release lever 42 is in the cartridge-receiving/-ejecting position. Accordingly, the latching surface 40a of the motor release arm 40b of the motor 40 is caught by the catching surface 42b of the motor release lever 42, and the motor 40 is thereby held in the disk-separation position. In such disk-separation position, the disk cartridge 16 is freely receivable within the frame 12 of the disk drive 10 without interference or blockage by such motor 40.

Referring now to FIGS. 2 and 2B, it is seen that during retention of the cartridge 14, the movement of the drag link 30 from the cartridge-receiving/-ejecting position to the cartridge retaining position causes the motor release lever pin 30b on such drag link 30 to move within the shaped slot 42a of the motor release lever 42 such that the motor release lever 42 moves from the cartridge-receiving/-ejecting position to the cartridge-retaining position. In so doing, the catching surface 42b of the motor release lever releases the latching surface 40a of the motor 40, and allows the motor 40 to helically move from the disk-separation position to the disk-engagement position under the bias of the associated biasing device. In such disk-engagement position, and as should be understood, the motor 40 engages the hub of the disk 16 in the cartridge 14 and can rotate the hub and disk 16 (FIG. 2B).

Referring especially to FIG. 7 now, it is seen that during ejection of the cartridge 14, the movement of the drag link 30 from the cartridge-retaining position to the cartridge-receiving/-ejecting position causes the motor release lever pin 30b to move within the shaped slot 42a of the motor release lever 42 such that the motor release lever 42 moves from the cartridge-retaining position to the cartridge-receiving/-ejecting position. Such movement of the drag link 30 also causes the motor release arm pin 30c mounted thereto to contact the motor release arm 40b and to helically move the motor release arm 40b and the motor 40 to the disk-separation position. When the motor 40 is in the disk-separation position, the catching surface 42b (FIG. 2) of the motor release lever 42 is also in position to catch the latching surface 40a (FIG. 2) of the motor 40, thereby holding the motor 40 in the disk-separation position. In such disk-separation position, the disk cartridge 16 is freely ejectable from the frame 12 of the disk drive 10 without interference or blockage by such motor 40.

Turning now to the head retracting assembly 20 and FIGS. 3–5A in particular, such assembly 20 is mounted to the frame 12 of the disk drive 10 to retract the head assembly 28 (FIGS. 3A, 4A, 5A) away from the retained disk cartridge 14 (FIG. 5), for example at a time just prior to ejection of the cartridge 14. Accordingly, the retracted head assembly 28 is not in contact with the ejecting cartridge 14, and the danger of damage to the head assembly 28 by the ejecting cartridge is minimized if not eliminated. As was discussed above, the head retracting assembly 20 is coupled to the retract/eject lever 24, and retracts the head assembly 28 when the actuator 18 performs a soft pick (i.e., is moved to the second position), thereby rotating the retract/eject lever 24 to the head retracting position. As was also discussed above, a hard pick necessarily includes a soft pick. As a result, head retracting is always performed just prior to cartridge ejection.

Figure 4:
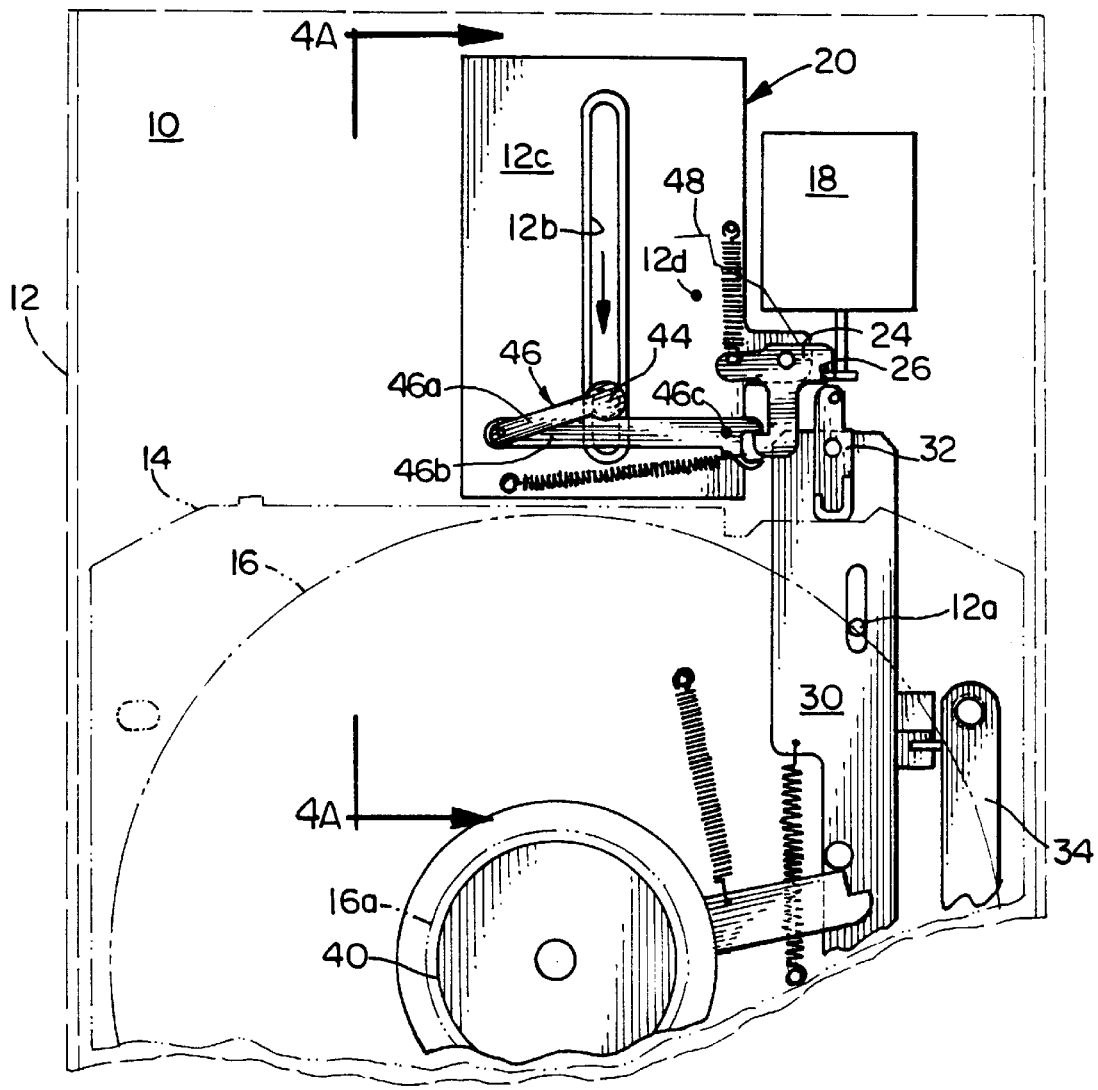
FIG. 4 is a partial diagrammatic view of the disk drive of FIG. 1, and shows the disk drive after the head assembly moves the linkage from the second position to the third position where the linkage is retained by the retract/eject lever.

In one embodiment of the present invention, and referring for example to FIG. 3, the frame 12 defines a guiding aperture 12b therein, and the head retracting assembly 20 includes a guide pin 44 captured and movable within the guiding aperture 12b. The guiding aperture 12b may be defined within a guide plate 12c mounted to the frame 12, as seen in FIGS. 3, 4, and 5, or may be defined directly by the frame 12. As seen, the guiding aperture 12b is generally linear and generally radially oriented with respect to the disk 16 within the retained disk cartridge 14. Nevertheless, the guiding aperture 12b may be non-linear and/or non-radial without departing from the spirit and scope of the present invention.

As shown, the guiding aperture 12b extends generally parallel to the first line L (FIG. 1), although such guiding aperture 12b may extend in other directions without departing from the spirit and scope of the present invention. As will be explained in more detail below, the path of the guiding aperture 12b and the guide pin 44 therein is intended to align with the path of the head assembly 28 (FIGS. 3A, 4A, 5A) as such head assembly 28 moves toward and away from the disk 16 within the disk cartridge 14. Accordingly, the head assembly 28 is generally movable along a line parallel to the guiding aperture 12b toward and away from the retained disk cartridge 14 and disk 16 therein.

In one embodiment of the present invention, and as particularly seen in FIG. 3A, the guide pin 44 includes a first axial portion 44a captured and movable within the guiding aperture and a second axial portion 44b immediately above or below the first portion 44a. Moreover, the head assembly 28 includes a contacting surface 28a that moves along a path traced by the guide pin 44. As should be appreciated, the contacting surface 28a contacts the second axial portion 44b of the guide pin 44 at some point along the path when the head assembly 28 moves toward the retained disk cartridge 14. Likewise, the second axial portion 44b of the guide pin 44 contacts such contacting surface 28a at some point along the path when the guide pin 44 moves away from the retained disk cartridge 14. Accordingly, when the head assembly and by extension the contacting surface 28a is extended all the way toward the retained disk cartridge 14 (FIGS. 4, 4A), such contacting surface 28a will necessarily move the guide pin 44 along to a corresponding location. Likewise, when the guide pin 44 is moved all the way away from the retained cartridge 14 (FIGS. 5, 5A), such guide pin 44 will necessarily move the contacting surface 28a and by extension the head assembly 28 along to a retracted location.

The guiding aperture 12b as shown in the drawings is slightly off from radial with respect to the disk 16 within the disk cartridge 14. In such a situation, if the head assembly 28 does in fact move on a true radial with respect to such disk 16, an offsetting structure (not shown) may be attached between the contacting surface 28 and the remainder of the head assembly to accommodate the offset of the guiding aperture 12b from the head assembly 28. Alternatively, the offsetting structure may extend from the guide pin 44 toward the head assembly 28.

As seen in FIGS. 3–5A, the guide pin 44 is coupled to a linkage 46 that includes first and second arms 46a, 46b joined at an elbow and rotatable with respect to each other about an axis at the elbow generally parallel to the first axis. The first arm 46a includes the guide pin 44 adjacent an end thereof opposite the elbow, and the first arm rotates about an axis at the guide pin generally parallel to the first axis. The second arm 46b includes a fixed point 46c adjacent an end thereof opposite the elbow, where the fixed point 46c is fixed with respect to the frame 12 such that the second arm 46c rotates about an axis at the fixed point 46c generally parallel to the first axis. Of course, other types of linkage 46 maybe employed without departing from the spirit and scope of the present invention, as long as such other linkage 46 performs the functions as described below.

As should now be apparent, the linkage 46 is generally movable within a plane generally perpendicular to the first axis and generally parallel to the retained disk cartridge, and the movement of the guide pin 44 within the guiding aperture 12c causes the arms 46a, 46b of the linkage 46 to bend at the elbow. As may be perceived from FIGS. 2–5, when the linkage 46 is fully extended, the guide pin 44, the elbow and the fixed point 46c form a generally straight line. In one embodiment of the present invention, the fixed point 46c of the linkage is relatively close to the disk 16 within the retained cartridge 14, and the guide pin 44 is relatively far from such disk 16 when the linkage 46 is fully extended.

As should be understood, then, the aforementioned fully extended linkage line extends from the guiding aperture 12b at a relatively far position with respect to the disk 16 to the fixed point at a relatively close distance to the disk 16, and at an angle with respect to the generally linear guiding aperture 12b. The bending elbow, then, may move either toward or away from the guiding aperture 12b as the linkage 'collapses'. In one embodiment of the present invention, a barrier 12d is mounted to the frame 12 to block the linkage 46 on the side away from the fully extended linkage line. The barrier 12d may be a pin, a ridge, a bar, or another blocking device. Accordingly, once the elbow crosses the fully extended linkage line and moves a relatively short distance away from the guiding aperture 12b, the linkage 46 can collapse no further, and the guide pin 44 at the one end of the first arm 46a of the linkage is relatively far from and can not move toward the disk 16 within the retained cartridge 14.

In operating the head retract assembly, the linkage 46 and the guide pin 44 coupled thereto are movable between:

a first position (FIGS. 2, 5) where the elbow is on a side of the fully extended linkage line away from the guiding aperture 12c and the linkage 46 abuts the barrier 12d, and the guide pin 44 is in a locked state and is relatively far from the retained disk cartridge 14, and a second position (FIG. 3) where the elbow is on a side of the fully extended linkage line toward the guiding aperture 12c, and the guide pin 44 is in an un-locked state and is relatively far from the retained disk cartridge 14, and a third position (FIG. 4) where the elbow is on the side of the fully extended linkage line toward the guiding aperture 12c, and the guide pin 44 is relatively close to the retained disk cartridge 14.

As should be appreciated, the locked state of the linkage 46 and the guide pin 44 in the first position thereof prevents the head assembly 28 from moving toward the retained disk cartridge, and also corresponds to the head assembly 28 being in a retracted position wherein the head assembly 28 is clear of the disk cartridge 14. In one embodiment of the present invention, the linkage 46 and the guide pin 44 are biased to the first position by a biasing device such as a spring, although other biasing devices may be employed without departing from the spirit and scope of the present invention.

Referring specifically to FIGS. 3 and 3A, now, it is seen that after the disk cartridge 14 is retained in the frame 12 and prior to reading/writing with the head assembly 28, the linkage 46 and guide pin 44 are moved from the first position (FIG. 2) to the second position (FIG. 3). Such movement is achieved by a soft pick from the actuator 18 and the consequent rotation of the retract/eject lever 24. As should be appreciated at this point, the soft pick rotates the retract/eject lever 24 enough to cause such movement of the linkage 46 and guide pin 44, but not so much as to rotate the cam 32 and cause an ejection of the retained cartridge 14.

In one embodiment of the present invention, a kicker 48 is mounted to the retract/eject lever 24 in such a manner that the soft pick causes the kicker 48 to 'kicking' the linkage 46 and guide pin 44 from the first position to the second position. As seen, the kick is delivered to the side of the linkage 46 opposite the guiding aperture 12b such that the linkage 44 moves away from the barrier 12d and into an orientation where such linkage 44 may collapse. Note that in the second position of FIG. 3, the biasing device still applies a bias to the linkage 46, but not so much that the linkage 46 and guide pin 44 return to the first position.

Referring specifically to FIGS. 4 and 4A, now, it is seen that only after the linkage 46 is in the second position, such linkage 46 and the guide pin 44 may be moved to the third position. Specifically, the head assembly 28 is energized in an appropriate manner to move toward the retained disk 16 and cartridge 44 such that the linkage 46 is pushed by way of the contacting surface 28a on the head assembly 28 and the second portion 44b of the guide pin 44 from the second position to the third position. In one embodiment of the present invention, the linkage 46 and the guide pin 44 are retained in the third position by a guide pin retaining device against the biasing force of the biasing device attached to the linkage 46.

As shown in FIGS. 4 and 4A, the guide pin retaining device is the retract/eject lever 24, which has a catching surface 24a (FIGS. 3, 5) for catching a latching surface 46d (FIGS. 3, 5) coupled to the guide pin 44 and/or linkage 46 when the guide pin 44 and linkage 46 move into the third position. In one embodiment of the present invention, the latching surface 46d is on the second arm 46b of the linkage 46 adjacent the fixed point 46c of such second arm 46b, and the catching surface 24a of the retract/eject lever 24 catches the latching surface 46d when the retract/eject lever 24 is in the cartridge-receiving /-retaining and guide pin retaining position (FIGS. 1, 4). Of course, other guide pin/linkage retaining devices may be employed without departing from the spirit and scope of the present invention.

Once the linkage 46 is latched against its biasing force, the head assembly 28 may be moved away from the guide pin 44 to perform the normal functions of reading data from and/or writing data to the disk 16 within the cartridge 14. Importantly, and as is shown, the linkage 46 and guide pin 44 in the third position do not interfere with such read/write functions of the head assembly 28.

At some later point it is advisable to retract the head assembly 28 into a position clear of the disk cartridge 14 and disk therein. Primarily, it is advisable to do so after reading/writing with the head assembly 28 is concluded and prior to ejecting the cartridge 14, although it may also be advisable to do so at other times. Referring specifically to FIGS. 5 and 5A, now, it is seen that in order to perform such retracting, a guide pin releasing device is employed to release the guide pin 44 and linkage 46 from the third position and to allow such released guide pin 44 and linkage 46 to return to the first position under the biasing force of the biasing device coupled to the linkage 44. Thus, the head assembly 28 is moved and locked away from the disk cartridge 14 when such cartridge 14 is to be ejected, or otherwise.

As shown in FIG. 5, the guide pin releasing device is the actuator 18 performing another soft pick. As should be appreciated at this point, this second soft pick rotates the retract/eject lever 24 enough to disengage the catching surface 24a thereof from the latching surface 46d of the linkage 46, thereby releasing the linkage 46 and guide pin 44 from the third position and allowing a return to the first position. Note that in contrast with the first soft pick, this second soft pick may be and is in fact likely to be a part of a hard pick for ejecting the disk cartridge 14. Of course, the soft pick portion of the hard pick causes the head assembly 28 to retract prior to ejecting the retained cartridge 14 from the frame 12.

As should now be appreciated, in returning to the first position, the linkage 46 pushes the head assembly 28 into a retracted position by way of contact established between the contacting surface 28a of such head assembly 28 and the second portion 44b of the guide pin 44 during such return. The head assembly 28 is then retained in the retracted position by virtue of the guide pin 44 being in the locked state once such guide pin 44 and linkage 46 are in the first position.

Note that as with the first soft pick, the second soft pick causes the kicker 48 to contact the linkage 46. However, in the second soft pick, such kicker should not move the linkage 46 from the first position (FIGS. 2, 5) to the second position (FIG. 3), or prevent the linkage 46 from the achieving such first position. Preferably, the momentum of the linkage during movement from the third position to the first position during the second soft pick is sufficient to counter the momentum of the kicker 48 during such second soft pick, thereby resiliently bending the kicker 48 back and allowing the linkage 46 to achieve the first position, as is particularly seen in FIG. 5.

In the present invention, a disk drive 10 includes a relatively simple actuator 18 and lever 24 that actuate both a read/write head assembly 28 and a cartridge transport assembly 22. While the present invention has been described in connection with the embodiments as shown in FIGS. 1–7, it is to be understood that other similar embodiments may be used or modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A disk drive comprising:

a frame for receiving and retaining a generally planar disk cartridge therein, the cartridge moving along a first line within the frame and including a disk accessible therein, the disk within the retained cartridge being rotatable about a first axis generally perpendicular to the first line and the frame and cartridge, the frame defining a guiding aperture therein;

a guide pin captured and movable within the guiding aperture;

a linkage including first and second arms joined at an elbow and rotatable with respect to each other about an axis at the elbow generally parallel to the first axis, the first arm including the guide pin adjacent an end thereof opposite the elbow, the guide pin being captured and movable within the guiding aperture such that the first arm rotates about an axis at the guide pin generally parallel to the first axis, and the second arm including a fixed point adjacent an end thereof opposite the elbow, the fixed point being fixed with respect to the frame such that the second arm rotates about an axis at the fixed point generally parallel to the first axis, the linkage being generally movable within a plane generally perpendicular to the first axis and generally parallel to the retained disk cartridge, the linkage being fully extended when the guide pin, the elbow and the fixed point form a generally straight line, the guide pin and the linkage residing in and movable between:

a first position wherein the guide pin is in a locked state and is relatively far from the retained disk cartridge, and wherein the elbow is on a side of the fully extended linkage line away from the guiding aperture and the guide pin is relatively far from the retained disk cartridge, a second position wherein the guide pin is in an un-locked state and is relatively far from the retained disk cartridge, and wherein the elbow is on a side of the fully extended linkage line toward the guiding aperture and the guide pin is relatively far from the retained disk cartridge, and a third position wherein the guide pin is in the un-locked state and is relatively close to the retained disk cartridge, and wherein the elbow is on the side of the fully extended linkage line toward the guiding aperture and the guide pin is relatively close to the retained disk cartridge, the linkage and guide pin being biased to the first position, the linkage having a latching surface coupled thereto;

a read/write head assembly mounted to the frame and generally movable toward and away from the retained disk cartridge and the disk therein for reading data from/writing data to such disk, the head assembly including a contacting surface that moves along a path traced by the guide pin and that contacts the guide pin at some point along the path when the head assembly moves toward the retained disk cartridge, the guide pin contacting the contacting surface at some point along the path when the guide pin moves away from the retained disk cartridge, the locked state of the guide pin in the first position thereof preventing the head assembly from moving toward the retained disk cartridge;

a guide pin retaining device mounted to the frame and having a catching surface for catching the latching surface coupled to the guide pin when the guide pin moves into the third position and for retaining the guide pin in the third position, the guide pin retaining device being movable between a catching/retaining position and a releasing position and biased to the catching/retaining position;

a guide pin releasing device mounted to the frame and cooperating with the guide pin retaining device to move such guide pin retaining device from the catching/retaining position to the releasing position to disengage the catching surface thereof from the latching surface, thereby releasing the guide pin from the third position prior to ejecting the retained cartridge from the frame;

wherein after the disk cartridge is retained in the frame and prior to reading/writing with the head assembly, the linkage and the guide pin are moved from the first position to the second position, and the head assembly is moved toward the retained disk such that the linkage and guide pin are moved from the second position to the third position and are retained in the third position by the guide pin retaining device, and wherein after reading/writing with the head assembly and prior to ejecting the disk cartridge from the frame, the guide pin releasing device releases the linkage and guide pin from the third position and the linkage and guide pin return to the first position, thereby ensuring that the head assembly is moved and locked away from the to-be-ejected disk cartridge.

2. The disk drive of claim 1 further comprising a guide plate mounted to the frame, the guide plate defining the guiding aperture therein.

3. The disk drive of claim 1 wherein the guiding aperture is generally linear.

4. The disk drive of claim 3 wherein the guiding aperture extends generally parallel to the first line.

5. The disk drive of claim 3 wherein the head assembly is generally movable along a line parallel to the guiding aperture toward and away from the retained disk cartridge.

6. The disk drive of claim 1 wherein the guide pin includes a first axial portion captured and movable within the guiding aperture and a second axial portion that is contacted by and contacts the contacting surface of the head assembly.

7. The disk drive of claim 1 further comprising a linkage barrier fixed with respect to the frame and positioned to contact the linkage when such linkage is in the first position, the linkage barrier restricting the linkage to prevent the elbow from moving farther away from the fully extended linkage line, thereby achieving the locking state of the guide pin by preventing the guide pin and the read/write head from moving toward the retained disk cartridge when the linkage is in the first position.

8. The disk drive of claim 1 wherein the latching surface of the linkage is on the second arm of such linkage adjacent the fixed point of such second arm.

9. The disk drive of claim 1 further comprising a kicker mounted to the frame for kicking the linkage from the first position to the second position.

10. The disk drive of claim 9 wherein the kicker is mounted and movable with the guide pin retaining device.

11. The disk drive of claim 1 wherein the guide pin releasing device is a selectively actuatable actuator.

12. The disk drive of claim 11 wherein the actuator is a solenoid having a plunger linearly movable between a plunged position and an extended position.

13. The disk drive of claim 12 wherein the guide pin retaining device is a retaining lever mounted to the frame, the retaining lever for being contacted by the plunger of the solenoid and being rotatable on an axis generally parallel to the first axis between the catching/retaining position and the releasing position, the plunger upon being moved into one of the plunged and the extended position contacting the retaining lever and thereby rotating the retaining lever into the releasing position.

14. The disk drive of claim 1 wherein the guide pin retaining device is a retaining lever mounted to the frame, the retaining lever being rotatable on an axis generally parallel to the first axis between the catching/retaining position and the releasing position.

* * * * *